United States Patent
Christie et al.

(10) Patent No.: US 11,358,547 B2
(45) Date of Patent: Jun. 14, 2022

(54) SENSOR INTERFACE FOR AUTONOMOUS VEHICLE

(71) Applicant: Aurora Operations, Inc., Mountain View, CA (US)

(72) Inventors: Cameron David Christie, San Francisco, CA (US); Anuranga Sajith Gunaratne, San Francisco, CA (US)

(73) Assignee: Aurora Operations, Inc., Mountain View, CA (US)

( * ) Notice: Subject to any disclaimer, the term of this patent is extended or adjusted under 35 U.S.C. 154(b) by 128 days.

(21) Appl. No.: 16/826,685

(22) Filed: Mar. 23, 2020

(65) Prior Publication Data
US 2021/0094490 A1    Apr. 1, 2021

Related U.S. Application Data

(63) Continuation of application No. 16/588,940, filed on Sep. 30, 2019, now Pat. No. 10,632,942.

(51) Int. Cl.

| | |
|---|---|
| *G01S 17/87* | (2020.01) |
| *B60R 16/03* | (2006.01) |
| *G05D 1/00* | (2006.01) |
| *B60R 16/02* | (2006.01) |
| *G06V 20/56* | (2022.01) |
| *H04L 12/40* | (2006.01) |
| *H04L 12/46* | (2006.01) |
| *G01S 13/87* | (2006.01) |
| *H04L 67/12* | (2022.01) |

(52) U.S. Cl.
CPC .......... *B60R 16/03* (2013.01); *B60R 16/0207* (2013.01); *G01S 13/878* (2013.01); *G01S 17/87* (2013.01); *G05D 1/0088* (2013.01); *G06V 20/56* (2022.01); *H04L 12/40006* (2013.01); *H04L 12/40045* (2013.01); *H04L 12/4625* (2013.01); *H04L 67/12* (2013.01); *Y04S 40/18* (2018.05)

(58) Field of Classification Search
CPC .. B60R 16/03; B60R 16/0207; G05D 1/0088; G06K 9/00791; H04L 67/12; H04L 12/4625; H04L 12/40006; H04L 12/40045; Y04S 40/18; G01S 17/87; G01S 13/878
See application file for complete search history.

(56) References Cited

U.S. PATENT DOCUMENTS

| | | |
|---|---|---|
| 2018/0050699 A1 | 2/2018 | Gauthier |
| 2019/0271989 A1* | 9/2019 | Guo ..................... G01S 5/0289 |
| 2020/0280827 A1* | 9/2020 | Fechtel .................. H04W 8/08 |

(Continued)

OTHER PUBLICATIONS

Lee J, Park S. Time-Sensitive Network (TSN) Experiment in Sensor-Based Integrated Environment for Autonomous Driving. Sensors. 2019; 19(5):1111. https://doi.org/10.3390/s19051111 (Year: 2019).*

(Continued)

*Primary Examiner* — Daniel Cavallari
(74) *Attorney, Agent, or Firm* — Freestone Intellectual Property Law PLLC; Aaron J. Visbeek; William J. Pigott

(57) ABSTRACT

A system for an autonomous vehicle includes sensors, a time sensitive network switch, and a sensor interface. The sensors are configured to generate sensor data. The time sensitive network switch is configured to receive the sensor data and an elevated voltage.

20 Claims, 7 Drawing Sheets

(56) References Cited

U.S. PATENT DOCUMENTS

2021/0006344 A1\* 1/2021 Chen .................. G01S 19/14

OTHER PUBLICATIONS

Samii, Soheil, and Helge Zinner. "Level 5 by layer 2: Time-sensitive networking for autonomous vehicles." IEEE Communications Standards Magazine 2.2 (2018): 62-68. (Year: 2018).\*
International Searching Authority, Patent Cooperation Treaty, European Application No. PCT/US2020/023720, Notification dated Jul. 13, 2020, 4 pages.
International Searching Authority, Patent Cooperation Treaty, European Application No. PCT/US2020/023720, Written Opinion, Notification dated Jul. 13, 2020, 8 pages.
Notification of International Searching Authority, Patent Cooperation Treaty, European Application No. PCT/US2020/023720, Notification dated Jul. 13, 2020, 1 page.
Wikipedia contributors. "CAN bus." Wikipedia, The Free Encyclopedia. Web Archive, Aug. 27, 2019. Web. Aug. 5, 2020, 18 pages.

\* cited by examiner

SENSOR INTERFACE FOR AUTONOMOUS VEHICLE

CROSS-REFERENCE TO RELATED APPLICATIONS

This application claims priority to U.S. non-provisional application Ser. No. 16/588,940, entitled, "Autonomous Vehicle Sensor Interface," filed Sep. 30, 2019, which is hereby incorporated by reference.

TECHNICAL FIELD

This disclosure relates generally to autonomous vehicles, and in particular to sensor interfaces for autonomous vehicles.

BACKGROUND INFORMATION

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to safely navigate through its environment.

BRIEF SUMMARY OF THE INVENTION

A system for an autonomous vehicle includes an array of sensors, a time sensitive network switch, and a data-power interface. The array of sensors is configured to capture one or more objects in an external environment of the autonomous vehicle and generate sensor data based on the captured one or more objects. The time sensitive network switch is configured to receive the sensor data. The data-power interface separately couples at least two of the sensors in the array to the time sensitive network switch. The data-power interface includes power conductors that comprise a first data conductor and a second data conductor. The power conductors provide the elevated voltage from the time sensitive network switch to the sensors in the array to power the sensors and the first data conductor and the second data conductor are configured to provide a high-speed vehicle communication link between the time sensitive network switch and the sensors. The elevated voltage is above 30 VDC, in some implementations. The sensors in the array of sensors include Light Detection and Ranging (LIDAR) and Radio Detection and Ranging (RADAR) sensors, in some implementations.

In some implementations, an autonomous vehicle may include an array of sensors, a time sensitive network switch, a data-power interface, and a control system. The array of sensors is configured to capture one or more objects in an external environment of the autonomous vehicle and generate sensor data based on the captured one or more objects. The time sensitive network switch is configured to receive the sensor data and the time sensitive network switch is also configured to receive an elevated voltage. The data-power interface separately couples the sensors in the array to the time sensitive network switch and the time sensitive network switch includes a separate connector for the data-power interface of at least two of the sensors in the array of sensors. The data-power interface includes power conductors to provide the elevated voltage from the time sensitive network switch to the sensors and a first data conductor and a second data conductor that are configured to provide a high-speed vehicle communication link between the time sensitive network switch and the sensors. The control system is configured to navigate the autonomous vehicle autonomously based at least in part on the sensor data.

The autonomous vehicle may further include a power distribution module coupled to the time sensitive network switch to provide the elevated voltage to the time sensitive network switch and the power distribution module may convert a vehicle battery voltage to the elevated voltage where the vehicle battery voltage is used to operate the vehicle. In some implementations of the autonomous vehicle, the time sensitive network switch includes an electrical regulator that regulates a current provided to the array of sensors on an individual sensor-by-sensor basis and the current is provided by the power conductors of the data-power interface.

An implementation of the disclosure includes a sensor electrical harness for an autonomous vehicle including a first connector, a second connector, power conductors, and a high-speed vehicle communication link. The first connector is configured to be connected to a time sensitive network switch. The second connector is configured to be connected to a sensor of the autonomous vehicle and the sensor is configured to capture one or more objects in an external environment of the autonomous vehicle and generate sensor data based on the captured one or more objects. The power conductors are configured to provide an elevated voltage to the sensor and the power conductors are coupled between the first connector and the second connector. The elevated voltage is above 30 VDC. The high-speed vehicle communication link is configured to transmit the sensor data generated by the sensor to the time sensitive network switch and the high-speed vehicle communication link is coupled between the first connector and the second connector.

In implementations of the disclosure, a data-power interface separately couples sensors of an autonomous vehicle to a time sensitive network switch. Each sensor only requires one connector since the data and power are combined into one harness that provides an elevated voltage to the sensors for periods of higher power consumption. The elevated voltage is provided to the sensor and the elevated voltage allows for high power delivery at lower currents, which reduces line losses to deliver the same amount of power at lower voltages. Having a separate connector for each sensor (e.g., having only one connector for each sensor) increases sensor placement locations on a vehicle due to the smaller footprint of the sensor and the smaller open-access area required to connect the harness to the sensor connectors. For example, feasibility for side mounting a larger sensor near a wheel-well of a vehicle increases due to a smaller overall sensor footprint. Routing the harnesses from the sensor location to the time sensitive network switch for data collection is also more feasible with routing only one harness instead of two. The conductors in the data-power interface may be smaller gauge wire to increase wire flexibility, routing ease, and/or routing locations of the data-power harness. The routing efficiency and sensor placement of the sensor within a vehicle may be particularly advantageous when the sensors are to be installed on different vehicle models and potentially after a vehicle leaves the factory of an Original Equipment Manufacturer (OEM) or other vehicle manufacturer. Having a separate connector for each sensor (e.g., having only one connector for each sensor) also increases the reliability of the sensors by reducing the connector failure points.

BRIEF DESCRIPTION OF THE DRAWINGS

Non-limiting and non-exhaustive implementations of the invention are described with reference to the following figures, wherein like reference numerals refer to like parts throughout the various views unless otherwise specified.

DETAILED DESCRIPTION

Figure 1A:
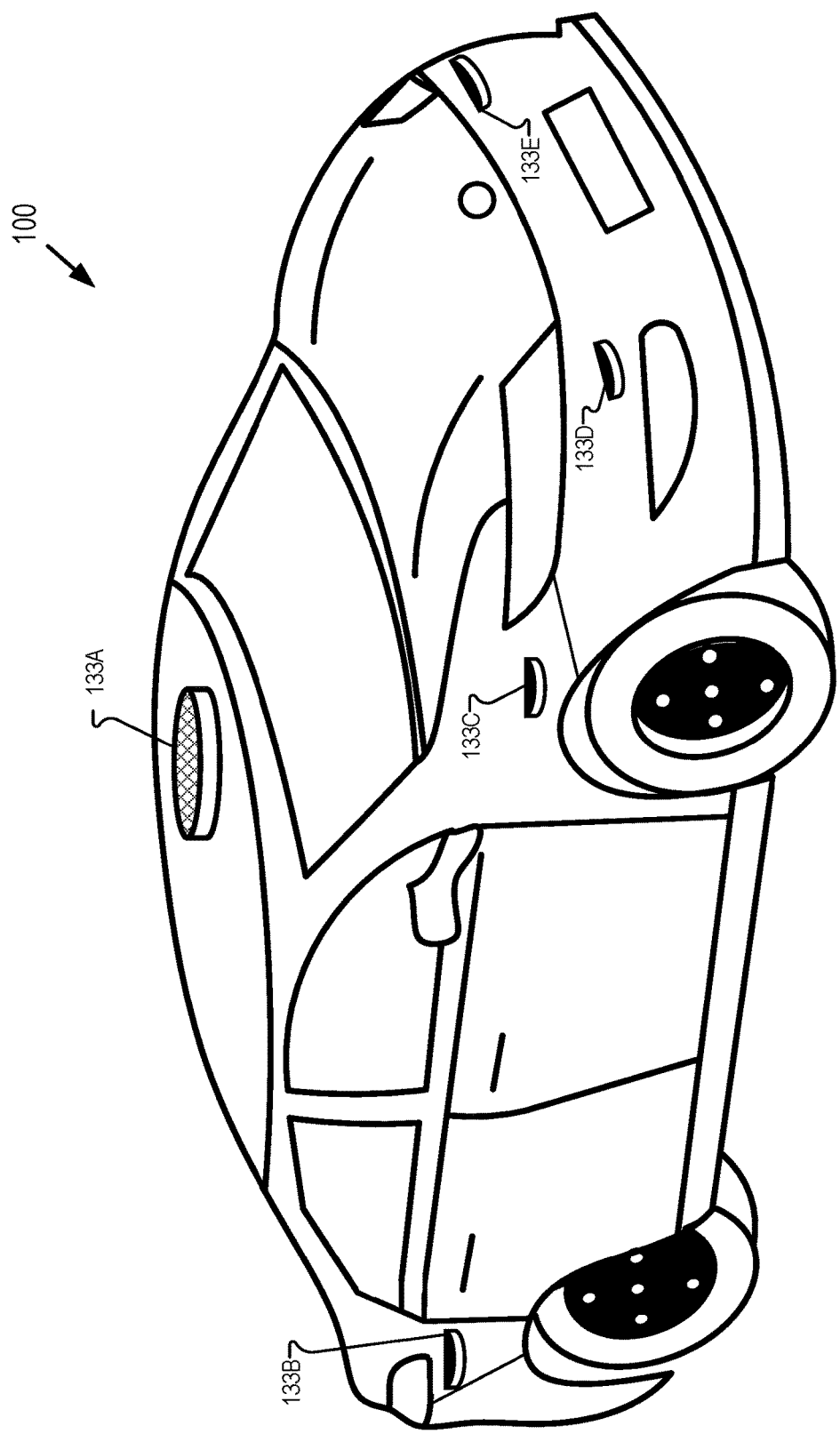
FIG. 1A illustrates an autonomous vehicle including an array of example sensors, in accordance with aspects of the disclosure.

Implementations of an autonomous vehicle and an autonomous vehicle system interface are described herein. In the following description, numerous specific details are set forth to provide a thorough understanding of the implementations. One skilled in the relevant art will recognize, however, that the techniques described herein can be practiced without one or more of the specific details, or with other methods, components, or materials. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" represents vehicles with autonomous features at any level of autonomy of the SAE International standard J3016.

This disclosure includes implementations of an autonomous vehicle that includes a data-power interface for sensors of the autonomous vehicle. In existing sensor systems, sensors for detecting the external environment of an autonomous vehicle include a first connector for connecting to an electrical power harness and a second connector for connecting to a data harness. Example sensors that may be used in autonomous vehicles include camera systems, RADAR systems, and LIDAR systems. The electrical power harness to power the sensor is typically coupled to a main vehicle battery with a positive and negative conductor of relatively large gauge wire. Having two connectors and two data harnesses (one for data and one for power) for each sensor increases the bulk of each sensor, which in turn, limits the placement of the sensor on the vehicle. Furthermore, having two connectors for each sensor provides two potential failure points for the sensors and therefore impacts reliability factors that are critical to autonomous vehicle operation.

In implementations of the disclosure, a data-power interface separately couples sensors of an autonomous vehicle to a time sensitive network switch. For example, each sensor only requires one connector since the data and power are combined into one harness that provides an elevated voltage to the sensors for periods of higher power consumption. The elevated voltage is provided to the sensor at all times and the elevated voltage allows for high power delivery at lower currents, which reduces line losses to deliver the same amount of power at lower voltages. In some implementations, having a separate connector for each sensor (e.g., having only one connector for each sensor) increases the number of possible sensor placement locations on a vehicle due to the smaller footprint of the sensor and the smaller open-access area required to connect the harness to the sensor connectors. For example, feasibility for side mounting a larger sensor near a wheel-well of a vehicle increases due to a smaller overall sensor footprint. Routing the harnesses from the sensor location to the time sensitive network switch for data collection is also more feasible with routing only one harness instead of two. The conductors in the data-power interface may be smaller gauge wire to increase wire flexibility, routing ease, and/or routing locations of the data-power harness. The routing efficiency and sensor placement of the sensor within a vehicle may be advantageous when the sensors are to be installed on different vehicle models and potentially after a vehicle leaves the factory of an Original Equipment Manufacturer (OEM) or other vehicle manufacturer. Having a separate connector for each sensor also increases the reliability of the sensors by reducing the connector failure points.

A time sensitive network switch of the disclosure includes connectors for connecting to a data-power interfaces harness that individually connects sensors of an autonomous vehicle to the time sensitive network switch. The time sensitive network switch receives the sensor data from each sensor over a high-speed communication link of the data-power interface. In some implementations, another data bus is included in the data-power interface and control signals are sent to the sensors through the time sensitive network switch. In some implementations, a power distribution module is coupled to the time sensitive network switch to provide the elevated voltage to the data-power interface. The time sensitive network switch may be configured to regulate a current and/or voltage provided to individual sensors, which allows for over-current protection of the sensor and allows for a power cycling of the sensor through the data-power interface.

Figure 1B:
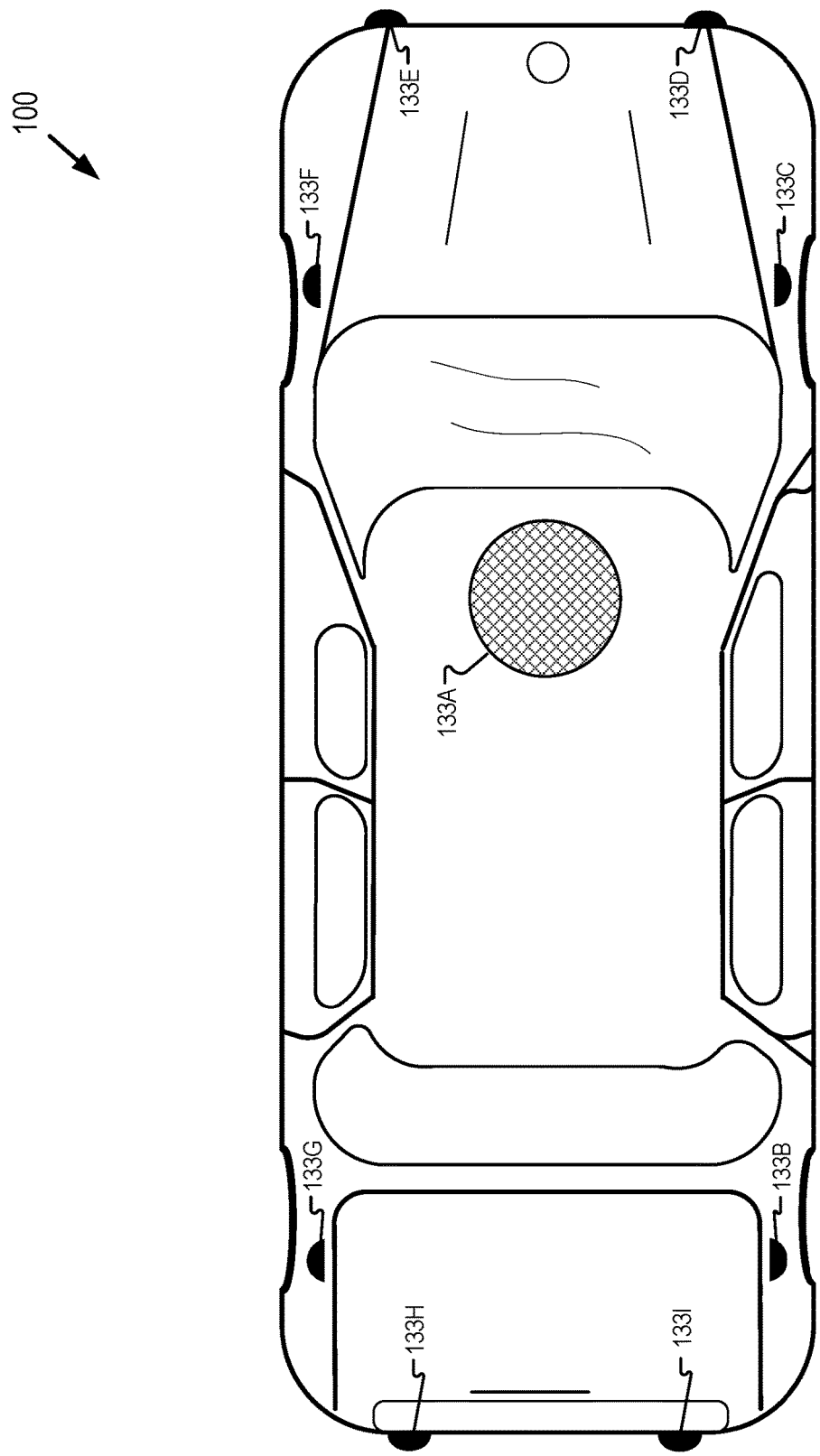
FIG. 1B illustrates a top view of an autonomous vehicle including an array of example sensors, in accordance with aspects of the disclosure.

FIG. 1A illustrates an example autonomous vehicle 100 that includes sensors and a data-power interface coupled between the sensors and a time sensitive network switch, in accordance with aspects of the disclosure. Autonomous vehicle 100 can include an array of sensors configured to capture one or more objects in an external environment of the autonomous vehicle and to generate sensor data based on the captured one or more objects for purposes of controlling the operation of autonomous vehicle 100. Dynamic objects may include people, animals, moving debris, bicycles, or other vehicles, and static objects may include signs, traffic lights, buildings, or barriers, for example. FIG. 1A shows sensor 133A, 133B, 133C, 133D, and 133E. FIG. 1B illustrates a top view of autonomous vehicle 100 including sensors 133F, 133G, 133H, and 133I in addition to sensors 133A, 133B, 133C, 133D, and 133E.

Figure 1C:
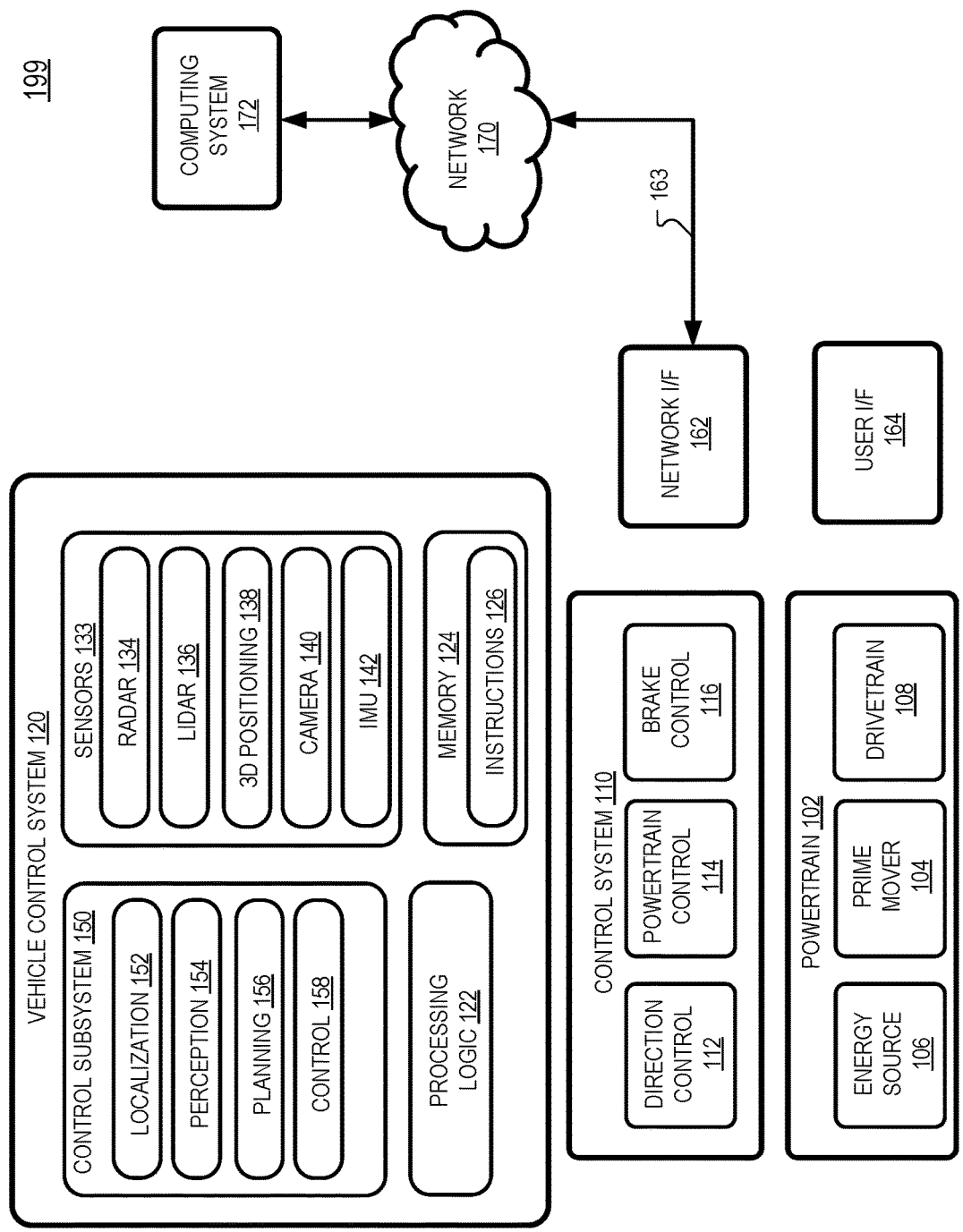
FIG. 1C illustrates an example vehicle control system including sensors, a drivetrain, and a control system, in accordance with aspects of the disclosure.

FIG. 1C illustrates block diagram 199 of an example system for autonomous vehicle 100. For example, autonomous vehicle 100 may include powertrain 102 including prime mover 104 powered by energy source 106 and capable of providing power to drivetrain 108. Autonomous vehicle 100 may further include control system 110 that includes direction control 112, powertrain control 114, and brake control 116. Autonomous vehicle 100 may be implemented as any number of different vehicles, including vehicles capable of transporting people, including vehicles capable of transporting people and/or cargo, and capable of traveling in a variety of different environments, and it will be appreciated that the aforementioned components 102-116 can vary widely based upon the type of vehicle within which these components are utilized.

The implementations discussed hereinafter, for example, will focus on a wheeled land vehicle such as a car, van, truck, or bus. In such implementations, prime mover 104 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 108 may include wheels and/or tires along with a transmission and/or any other mechanical drive components suitable for converting the output of prime mover 104 into vehicular motion, as well as one or more brakes configured to controllably stop or slow autonomous vehicle 100 and direction or steering components suitable for controlling the trajectory of autonomous vehicle 100 (e.g., a rack and pinion steering linkage enabling one or more wheels of autonomous vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 112 may include one or more actuators and/or sensors for controlling and receiving feedback from the direction or steering components to enable the autonomous vehicle 100 to follow a desired trajectory. Powertrain control 114 may be configured to control the output of powertrain 102, e.g., to control the output power of prime mover 104, to control a gear of a transmission in drivetrain 108, thereby controlling a speed and/or direction of the autonomous vehicle 100. Brake control 116 may be configured to control one or more brakes that slow or stop autonomous vehicle 100, e.g., disk or drum brakes coupled to the wheels of the vehicle.

Other vehicle types, including but not limited to off-road vehicles, all-terrain or tracked vehicles, or construction equipment, will necessarily utilize different powertrains, drivetrains, energy sources, direction controls, powertrain controls and brake controls, as will be appreciated by those of ordinary skill having the benefit of the instant disclosure. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 100 is implemented using vehicle control system 120, which may include one or more processors in processing logic 122 and one or more memories 124, with processing logic 122 configured to execute program code (e.g., instructions 126) stored in memory 124. Processing logic 122 may include, for example, graphics processing unit(s) (GPUs), central processing unit(s) (CPUs), for example.

Sensors 133A-133I may include various sensors suitable for capturing and collecting data from an autonomous vehicle's surrounding environment for use in controlling the operation of the autonomous vehicle. For example, sensors 133A-133I can include RADAR unit 134, LIDAR unit 136, 3D positioning sensor(s) 138, e.g., a satellite navigation system such as GPS, GLONASS, BeiDou, Galileo, or Compass. In some implementations, 3D positioning sensor(s) 138 can determine the location of the vehicle on the Earth using satellite signals. Sensors 133A-133I can optionally include one or more cameras 140 and/or an Inertial Measurement Unit (IMU) 142. In some implementations, camera 140 can be a monographic or stereographic camera and can record still and/or video images. Camera 140 may include a Complementary Metal-Oxide-Semiconductor (CMOS) image sensor configured to capture images of one or more objects in an external environment of autonomous vehicle 100. IMU 142 can include multiple gyroscopes and accelerometers capable of detecting linear and rotational motion of autonomous vehicle 100 in three directions. One or more encoders (not illustrated) such as wheel encoders may be used to monitor the rotation of one or more wheels of autonomous vehicle 100.

The outputs of sensors 133A-133I may be provided to control subsystems 150, including, localization subsystem 152, planning subsystem 156, perception subsystem 154, and control subsystem 158. Localization subsystem 152 is configured to determine the location and orientation (also sometimes referred to as the "pose") of autonomous vehicle 100 within its surrounding environment, and generally within a particular geographic area. The location of an autonomous vehicle can be compared with the location of an additional vehicle in the same environment as part of generating labeled autonomous vehicle data. Perception subsystem 154 is configured to detect, track, classify, and/or determine objects within the environment surrounding autonomous vehicle 100. Planning subsystem 156 is configured to generate a trajectory for autonomous vehicle 100 over a particular timeframe given a destination as well as the static and moving objects within the environment. A machine learning model in accordance with several implementations can be utilized in generating a vehicle trajectory. Control subsystem 158 is configured to operate control system 110 in order to implement the trajectory of autonomous vehicle 100. In some implementations, a machine learning model can be utilized to control an autonomous vehicle to implement the trajectory.

It will be appreciated that the collection of components illustrated in FIG. 1C for vehicle control system 120 is merely exemplary in nature. Individual sensors may be omitted in some implementations. In some implementations, different types of sensors illustrated in FIG. 1C may be used for redundancy and/or for covering different regions in an environment surrounding an autonomous vehicle. In some implementations, different types and/or combinations of control subsystems may be used. Further, while subsystems 152-158 are illustrated as being separate from processing logic 122 and memory 124, it will be appreciated that in some implementations, some or all of the functionality of subsystems 152-158 may be implemented with program code such as instructions 126 resident in memory 124 and executed by processing logic 122, and that these subsystems 152-158 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 120 may be networked in various manners.

In some implementations, autonomous vehicle 100 may also include a secondary vehicle control system (not illustrated), which may be used as a redundant or backup control system for autonomous vehicle 100. In some implementations, the secondary vehicle control system may be capable of operating autonomous vehicle 100 in response to a particular event. The secondary vehicle control system may have limited functionality, e.g., to perform a controlled stop of autonomous vehicle 100. In still other implementations, the secondary vehicle control system may be omitted.

In some implementations, different architectures, including various combinations of software, hardware, circuit logic, sensors, and networks may be used to implement the various components illustrated in FIG. 1C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories. In addition, each memory may be considered to include a memory storage physically located elsewhere in autonomous vehicle 100, e.g., any cache memory in a processor, as well as any storage capacity used as a virtual memory, e.g., as stored on a mass storage device or another computer controller. Processing logic 122 illustrated in FIG. 1C, or entirely separate processing logic, may be used to implement additional functionality in autonomous vehicle 100 outside of the purposes of autonomous control, e.g., to control entertainment systems, to operate doors, lights, or convenience features.

In addition, for additional storage, autonomous vehicle 100 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 100 may include user interface 164 to enable autonomous vehicle 100 to receive a number of inputs from a passenger and generate outputs for the passenger, e.g., one or more displays, touchscreens, voice and/or gesture interfaces, buttons and other tactile controls. In some implementations, input from a passenger may be received through another computer or electronic device, e.g., through an app on a mobile device or through a web interface.

In some implementations, autonomous vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which autonomous vehicle 100 receives environmental and other data for use in autonomous control thereof. In some implementations, data collected by one or more of sensors 133A-133I can be uploaded to computing system 172 through network 170 for additional processing. In such implementations, a time stamp can be associated with each instance of vehicle data.

Processing logic 122 illustrated in FIG. 1C, as well as various additional controllers and subsystems disclosed herein, generally operate under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 100 through network 170, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 1C is not intended to limit implementations disclosed herein. Indeed, those skilled in the art will recognize that other alternative hardware and/or software environments may be used without departing from the scope of implementations disclosed herein.

Figure 2:
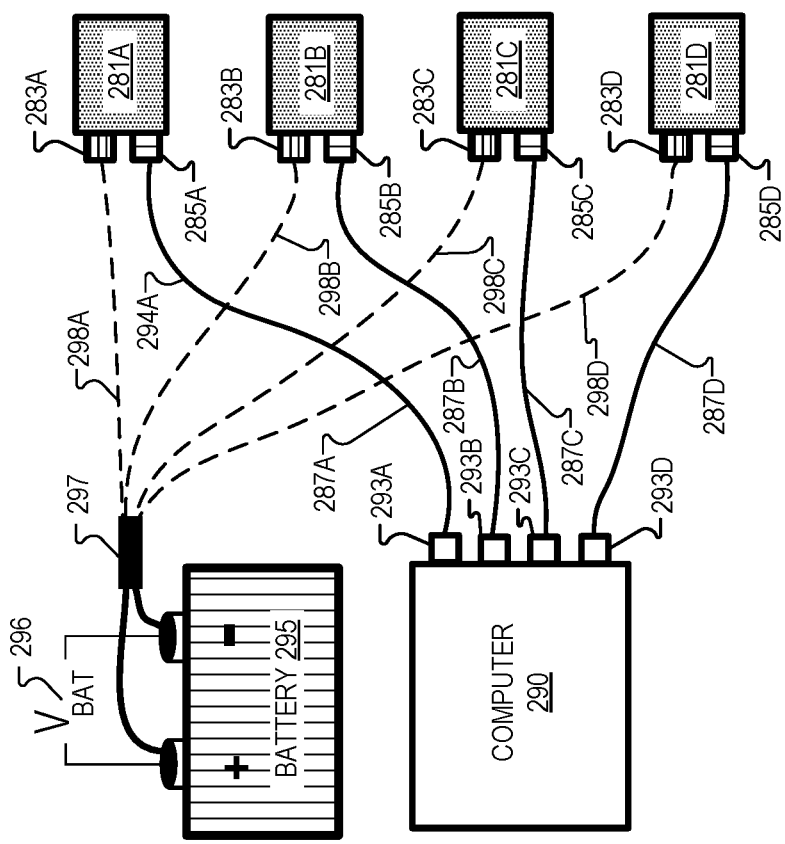
FIG. 2 illustrates a conventional arrangement for providing power to sensors of a vehicle and receiving data from the sensors by a computer of the vehicle.

FIG. 2 illustrates a conventional arrangement for providing power to sensors of a vehicle and receiving data from the sensors by a computer of the vehicle. FIG. 2 includes sensors 281A, 281B, 281C, and 281D. Sensors 281A, 281B, 281C, and 281D respectively include first connectors 283A, 283B, 283C, and 283D. In this example, first connectors 283A, 283B, 283C, and 283D are respectively coupled to power conductors 298A, 298B, 298C, and 298D of power harness 297 that is coupled to vehicle battery 295. Vehicle battery 295 provides battery voltage 296, which may be 12-14 VDC, for example. Vehicle battery 295 may be the main vehicle battery that provides electrical power for vehicle electrical subsystems such as lighting, wiper operation, power locks, power windows, convenience operations, entertainment systems, and seat operation, for example. Vehicle battery 295 may also provide starting amperage to a starter for turning over a petrol engine. Sensors 281A, 281B, 281C, and 281D include second connectors 285A, 285B, 285C, and 285D that are respectively coupled to data buses 287A, 287B, 287C, and 287D. Computer 290 is a vehicle computer having separate connectors 293A, 293B, 293C, and 293D that respectively receive sensor data from sensors 281A, 281B, 281C, and 281D. Data buses 287A, 287B, 287C, and 287D can be coupled between respective connectors 293A, 293B, 293C, and 293D and respective connectors 285A, 285B, 285C, and 285D.

Figure 3:
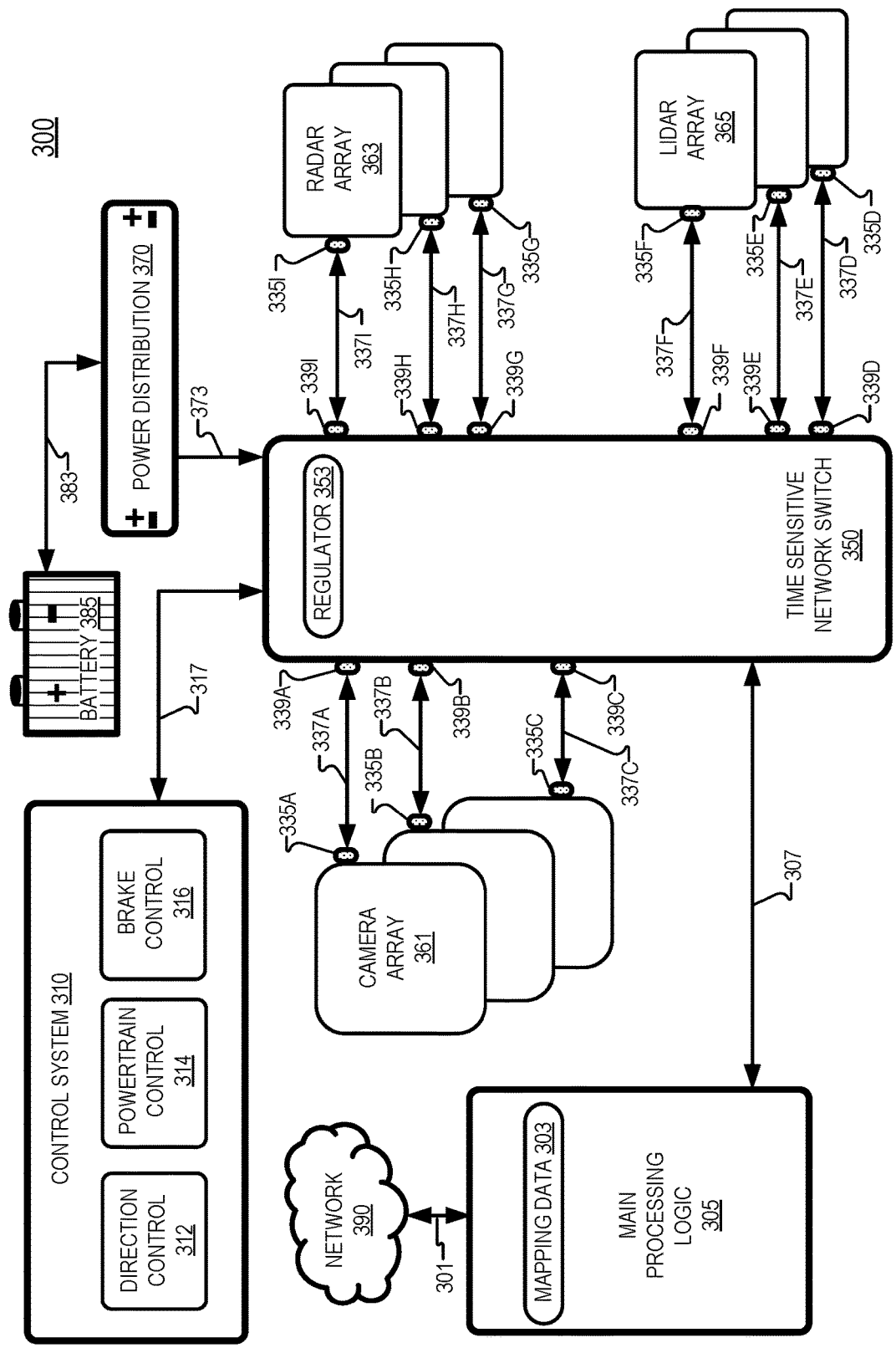
FIG. 3 illustrates a block diagram of an example system that may be included in an autonomous vehicle, in accordance with aspects of the disclosure.

FIG. 3 illustrates a block diagram of example system 300 that may be included in an autonomous vehicle, in accordance with aspects of the disclosure. System 300 includes main processing logic 305, time sensitive network switch 350, power distribution module 370, vehicle battery 385, network 390, camera array 361, RADAR sensor array 363, and LIDAR sensor array 365. Sensors in addition to camera array 361, RADAR sensor array 363, and LIDAR sensor array 365 may also be included in system 300. Vehicle battery 385 may be a main vehicle battery for a vehicle such as autonomous vehicle 100 for operating the vehicle electrical subsystems. Vehicle battery 385 may provide a voltage of 12-14 VDC, for example. Vehicle battery 385 is configured to provide electrical power to power distribution module 370 through battery interface 383, in FIG. 3. Power distribution module 370 may be configured to convert the vehicle battery voltage provided by vehicle battery 385 to an elevated voltage and provide the elevated voltage to time sensitive network switch 350 through elevated voltage interface 373. Power distribution module 370 may include power converters and/or power regulators (e.g. switching power supplies) configured to convert the vehicle battery voltage to an elevated voltage. In some implementations, "elevated voltage" is defined as a voltage at or above 30 VDC. In some implementations, the elevated voltage is approximately between 40-50 VDC. Elevated voltages above 50 VDC may also be used, in some implementations. However, the elevated voltage is not limited to a particular voltage level, but can be any voltage level to drive multiple sensors and one or more computers that include multiple processors such as a CPU and a GPU.

In some implementations, the elevated voltage is between 40 VDC and 50 VDC. With an elevated voltage between 40 VDC and 50 VDC, the same power delivery to the sensor can be achieved with lower currents compared to conventional vehicle bus voltages (e.g. 12 VDC). The lower current draw reduces line losses and therefore offers a more efficient data-power interface that also dissipates less heat. The reduced current draw also allows for lower potential wire bending radius and thus easier routing. In some implementations, the elevated voltage is between 30 VDC and 40 VDC, which may provide at least a portion of the same benefits as the 40 VDC and 50 VDC range while also requiring fewer battery resources than the 40 VDC-50 VDC range.

In addition to receiving the elevated voltage from power distribution module 370, time sensitive network switch 350 is configured to transfer data. In autonomous vehicles, high-speed data transfer for data that impacts vehicle operation is critical. Time sensitive network switch 350 is communicatively coupled to main processing logic 305 through high-speed data interface 307. High-speed data interface 307 may be one or more 10 Gigabit per second (Gb/s) connections. In an implementation, main processing logic 305 is communicatively coupled to time sensitive network switch 350 through two 10 Gb/s connections of high-speed data interface 307.

Time sensitive network switch 350 is individually coupled to a plurality of sensors by way of a data-power interface, in FIG. 3. In the particular illustration of FIG. 3, time sensitive network switch 350 is individually coupled to each camera in camera array 361 through data-power interfaces 337A, 337B, and 337C. That is, each camera in camera array 361 has connector 335 coupled to connector 339 of time sensitive network switch 350 through its own data-power interface 337. In the illustrated implementation of FIG. 3, connector 335A is coupled to connector 339A through data-power interface 337A, connector 357B is coupled to connector 339B through data-power interface 337B, and connector 357C is coupled to connector 339C through data-power interface 337C. Similarly, time sensitive network switch 350 is individually coupled to each RADAR sensor in RADAR sensor array 363 through data-power interfaces 337G, 337H, and 337I. That is, each RADAR sensor in RADAR sensor array 363 has connector 335 coupled to connector 339 of time sensitive network switch 350 through its own data-power interface 337. In the illustrated implementation of FIG. 3, connector 335G is coupled to connector 339G through data-power interface 337G, connector 335H is coupled to connector 339H through data-power interface 337H, and connector 335I is coupled to connector 339I through data-power interface 337I. FIG. 3 also illustrates time sensitive network switch 350 is individually coupled to each LIDAR sensor in LIDAR sensor array 365 through data-power interfaces 337D, 337E, and 337F. That is, LIDAR sensors in LIDAR sensor array 365 has respective connectors 335D, 335E, and 335F that are respectively coupled to connectors 339D, 339E, and 339F of time sensitive network switch 350 through its own data-power interface 337. In the illustrated implementation of FIG. 3, connector 335D is coupled to connector 339D through data-power interface 337D, connector 335E is coupled to connector 339E through data-power interface 337E, and connector 335F is coupled to connector 339F through data-power interface 337F. In these implementations, the cameras, RADAR sensors, and LIDAR sensor are merely examples of sensors that can be implemented as sensors of an autonomous vehicle that may be coupled to time sensitive network switch 350 through data-power interface 337. Consequently, data-power interface 337 may separately couple any sensors that are utilized in different implementations to time sensitive network switch 350 where time sensitive network switch 350 includes a separate connector for data-power interface 337 of each sensor in the array of sensors.

Data-power interface 337 includes at least one high-speed vehicle communication link and also provides an elevated voltage to each sensor to power the sensor. The high-speed vehicle communication link may be defined as more than 100 Megabits per second (Mb/s), in some implementations.

Figure 4:
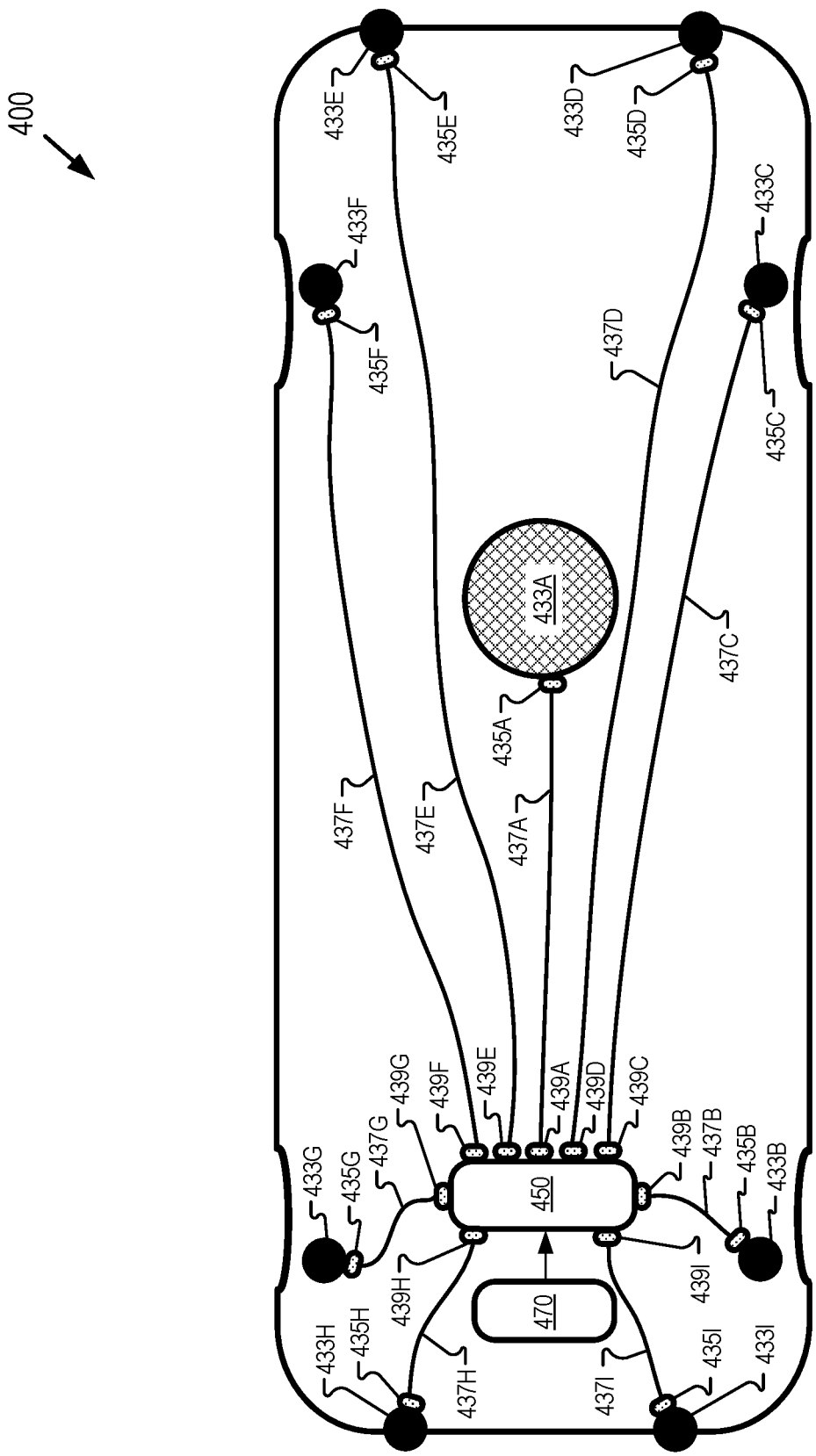
FIG. 4 illustrates an example system of an autonomous vehicle with sensors having a data-power interface to a time sensitive network switch, in accordance with aspects of the disclosure.

FIG. 4 illustrates an example system of autonomous vehicle 400 with sensors having a data-power interface to a time sensitive network switch. In FIG. 4, each sensor in autonomous vehicle 400 is coupled to time sensitive network switch 450 by a data-power interface, in accordance with aspects of the disclosure. Time sensitive network switch 450 receives elevated power from power distribution module 470. Power distribution module 470 and time sensitive network switch 450 may be configured similarly to power distribution module 370 and time sensitive network switch 350, respectively. FIG. 4 illustrates a total of nine sensors 433A-433I included in autonomous vehicle 400, although more sensors or fewer sensors may be used in other systems. Each sensor 433A, 433B, 433C, 433D, 433E, 433F, 433G, 433H, and 433I is coupled to time sensitive network switch 450 through a data-power interface. Data-power interface 437 is coupled between connectors 435 and connectors 439 in a one-to-one relationship. Specifically, in FIG. 4, connector 435A is coupled to connector 439A through data-power interface 437A, connector 435B is coupled to connector 439B through data-power interface 437B, connector 435C is coupled to connector 439C through data-power interface 437C, connector 435D is coupled to connector 439D through data-power interface 437D, connector 435E is coupled to connector 439E through data-power interface 437E, connector 435F is coupled to connector 439F through data-power interface 437F, connector 435G is coupled to connector 439G through data-power interface 437G, connector 435H is coupled to connector 439H through data-power interface 437H, and connector 435I is coupled to connector 439I through data-power interface 437I.

Figure 5A:
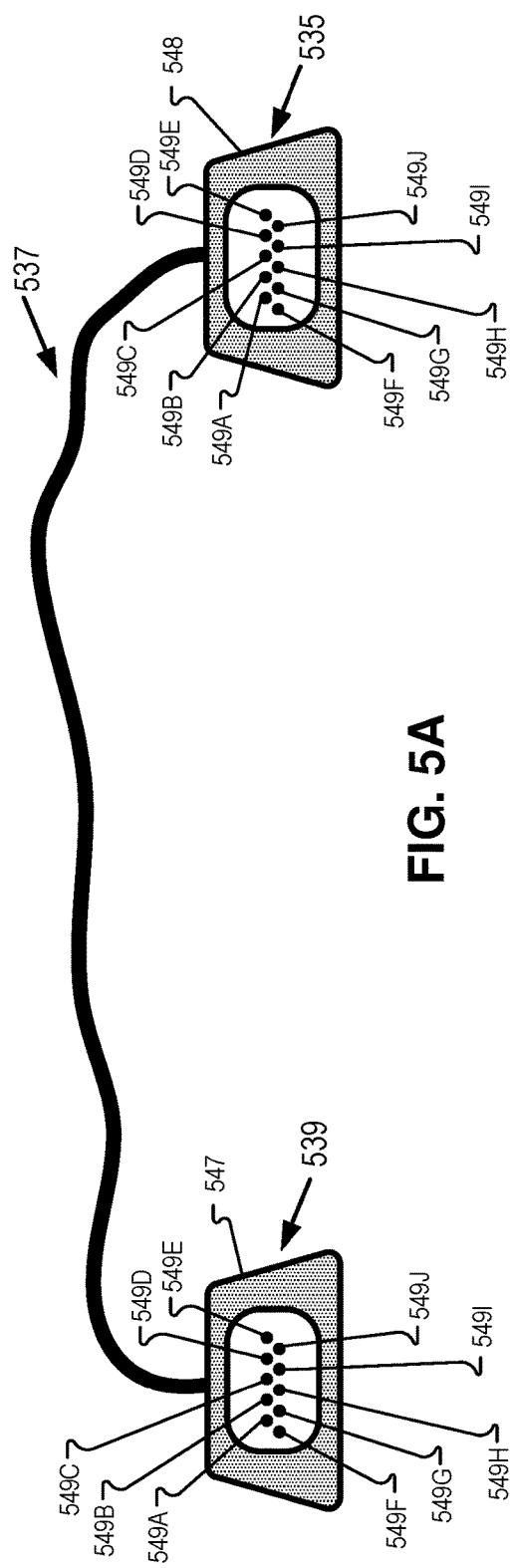
FIGS. 5A-5B illustrates an example data-power interface, in accordance with aspects of the disclosure.

FIG. 5A illustrates an example data-power interface 537, in accordance with aspects of the disclosure. FIG. 5A illustrates an example connector 539 as an example of connectors that may be included in a time sensitive network switch and example connector 535 that may be coupled to a sensor. For example, connector 539 may be used as connector 339A, 339B, 339C, 339D, 339E, 339F, 339G, 339H, 339I, 439A, 439B, 439C, 439D, 439E, 439F, 439G, 439H, or 439I, and connector 535 may be used as connector 335A, 335B, 335C, 335D, 335E, 335F, 335G, 335H, 335I, 435A, 435B, 435C, 435D, 435E, 435F, 435G, 435H, or 435I. Connector 539 includes connector body 547. Connector body 547 may be plastic and house conductors 549A-549J. Connector 535 includes connector body 548. Connector body 548 may be plastic and house conductors 549A-549J. In the illustrated implementation, data-power interface 537 includes ten conductors that may be coupled into pins of connectors 535 and 539. In other implementations, additional conductors may be included in data-power interface 537. In some implementations, connectors 535 and 539 may have the same size or material. In some implementations, connectors 535 and 539 may have different sizes or materials. Each connector 535 and 539 may have a male and female end that are coupled together to plug into the time sensitive network switch and the sensors, respectively. When data-power interface 537 is unplugged from both the sensor and the time sensitive network switch, it may be considered an electrical harness including two connectors coupled together by insulated wires and a jacket to gather and protect the insulated wires.

Figure 5B:
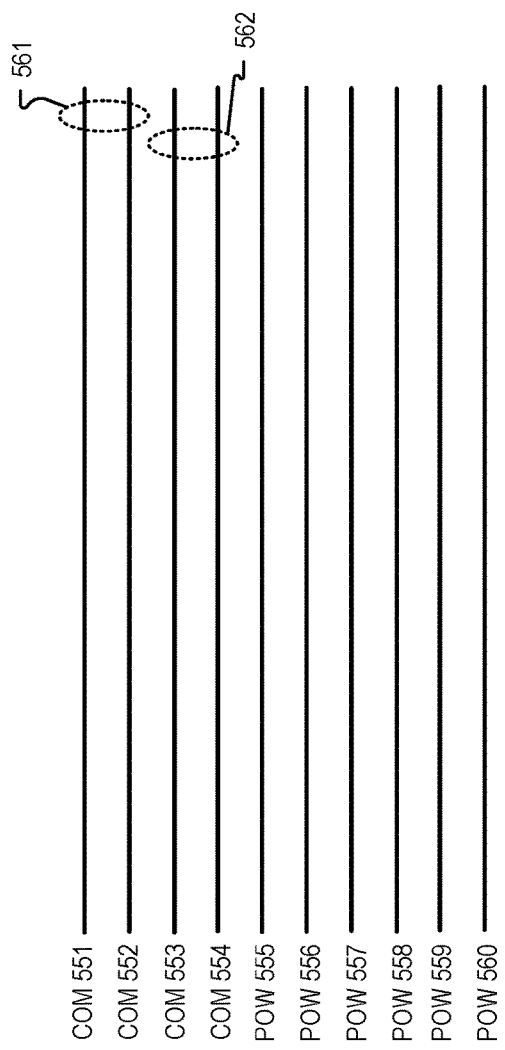

FIG. 5B illustrates ten conductors including communication conductors 551-554 and power conductors 555-560. Conductors 551-560 may include aluminum or copper, for example. Conductors 551-560 may be used as examples of conductors 549A-549J of data-power interface 537, in some implementations. First data conductor 551 and second data conductor 552 provide high-speed vehicle communication link 561 between time sensitive network switch 450 and each of the sensors, for example. In one implementation, high-speed vehicle communication link 561 is a 100 Mb/s connection, for example. In one implementation, high-speed vehicle communication link 561 is a 1 Gigabit per second (Gb/s) connection. First data conductor 551 and second data conductor 552 may be configured in a twisted pair arrangement, a coaxial configuration, or otherwise. FIG. 5B also shows that data-power interface 537 may include second high-speed vehicle communication link 562 that includes third data conductor 553 and fourth data conductor 554. High-speed vehicle communication link 562 may be a 100 Mb/s or 1 Gb/s connection, for example. In some implementations, the illustrated data conductors may be replaced with optical fiber to facilitate a high-speed vehicle communication link.

In one implementation, first high-speed vehicle communication link 561 is an ethernet connection of 1 Gb/s and second high-speed vehicle communication link 562 is a lower speed connection (e.g. 500 Mb/s). Second high-speed vehicle communication link 562 may be a Controller Area Network (CAN) link. In some implementations, sensor(s) connected to a time sensitive network switch by way of data-power interfaces 537 report sensor data to the time sensitive network switch over the faster ethernet connection of first high-speed vehicle communication link 561 and receive control data through second high-speed vehicle communication link 562. By way of example, some sensors are steerable in that they are capable of imaging different fields of view. In these examples, the sensors may physically move to image a different field of view of an external environment of the vehicle or the sensors may adjust their beam-forming algorithms to direct an imaging beam (e.g. infrared beam or RADAR beam) at different angles relative to the sensor. In these cases, the steerable sensors may receive control data signals over second high-speed vehicle communication link 562, the control data signals directing the sensors as to what field of view to image while the sensor is providing sensor data through first high-speed vehicle communication link 561 to time sensitive network switch 450.

Some or all of power conductors 555-560 of FIG. 5B are utilized to carry an elevated voltage above 30 VDC to power sensors 433. In an implementation, the elevated voltage is between 40-50 VDC. In an implementation, power conductors 555 and 556 are configured as positive conductors, power conductor 557 is configured as a ground conductor, and power conductors 558-560 are configured as ground-shield conductors. In some implementations, there are only four power conductors. Power conductors 555-560 may deliver 100 or more watts to each sensor while having a wire diameter of less than 0.644 mm, which corresponds to 22 American Wire Gauge (AWG) wire. In an implementation, the power conductors may have a wire diameter of less than 0.405 mm, which corresponds to 26 AWG. In another implementation, the power conductors are 28 AWG or less. In an implementation, the power conductors include two positive power conductors and two negative power conductors that are 28 AWG and provide a combined 3.0 Amps at a certain voltage between 40 and 50 VDC (1.5 Amps per conductor) to deliver more than 100 Watts to each sensor over data-power interface 537.

Power conductors in data-power interface 537 may have a same wire gauge as first and second data conductors 551 and 552. First and second data conductors 551 and 552 may have a diameter corresponding with 22, 26, or 28 AWG. In some implementations, first and second data conductors 551 and 552 have a wire diameter of less than 28 AWG. Third and fourth data conductors 553 and 554 may also have the same wire gauge as first and second data conductors 551 and 552. By assigning the power conductors the same smaller wire gauge, the data conductors allow for expanded potential routing paths for data-power interface 537 and consequently make an installation of the sensors more efficient and/or provide a wider range of available sensor placements. Small diameter wire may allow for sharper bending radii in the routing path of the data-power interface without causing the wires to break or become susceptible to breakage, for example. To facilitate the smaller diameter wires for the power conductors while still delivering 100 watts or more power to the sensor, the power conductors may have to number four or more (e.g. two positive conductors and two negative/ground conductors). In implementations where larger diameter wires are utilized, more power may be delivered with the larger diameter wires. In some implementations, utilizing larger diameter wires for the power conductors allows for only two power conductors, which may be more cost efficient.

Referring again to FIG. 4, combining the power conductors and a high-speed vehicle communication link into data-power interface 437 reduces the physical footprint of sensors 433A-433I by reducing the required connectors down to one connector while also reducing the potential failure points, when compared with the conventional configuration of FIG. 2. Reducing the footprint of sensors 433A-433I allows more possibilities for a sensor placement in autonomous vehicle 400. For example, it is desirable for a larger RADAR or LIDAR sensor may be placed near the wheel-well of autonomous vehicle 400 not to extend too far outside of the factory profile of autonomous vehicle 400. Reducing the sensor size by reducing required connectors allows a larger sensor to more closely conform to the sheet-metal profile of autonomous vehicle 400. Hence, a placement of a larger sensor such as sensors 433B, 433C, 433F, 433G, for example, is more attainable. A sensor placement is especially important in autonomous vehicle design so as to image the external environment of the vehicle from an advantageous position. Thus, having access to more sensor placements areas may allow for a reduced number of sensors in autonomous vehicle 400 while still being able to properly image the external environment of autonomous vehicle 400.

Returning back to FIG. 3, time sensitive network switch 350 is configured to receive sensor data from any of the sensors in the array of sensors that are coupled to time sensitive network switch 350 through data-power interface 337. Time sensitive network switch 350 is also configured to receive an elevated voltage from power distribution module 370, in the illustrated implementation. Time sensitive network switch 350 may include electrical regulator 353 that regulates a current or voltage provided to the array of sensors on an individual sensor-by-sensor basis. Electrical regulator 353 may be configured to power-cycle an individual sensor in some implementations. Electrical regulator 353 may include transistors that control the current and/or voltage provided to each data-power interface 337. If a sensor is providing unusual data patterns, electrical regulator 353 may be utilized to power-cycle the sensor to reset the sensor, for example. If a sensor is drawing too much power or is exhibiting a faulty behavior, electrical regulator 353 may regulate the power provided to the sensor. Hence, consolidating the data and power for sensors in data-power interface 337 connected to time sensitive network switch 350 provides yet another advantage of regulating the current and/or voltage provided to the sensors with time sensitive network switch 350, when appropriate.

When sensors provide sensor data to time sensitive network switch 350, time sensitive network switch 350 may provide this sensor data to main processing logic 305 through high-speed data interface 307. In some implementations, time sensitive network switch 350 prioritizes (e.g., in time) the transmission of sensor data received from particular sensors to main processing logic 305 through high-speed data interface 307. Main processing logic 305 may be a processing board including a plurality of multi-core processors and a plurality of memory devices. The processing board may also include communication interfaces and be coupled to a heat-sink or be cooled by a fan system. Main processing logic 305 may process the sensor data received from time sensitive network switch 350 to determine or classify dynamic or static objects (e.g. buildings, barriers, people, animals, other vehicles), obstacles, signs, in an external environment of an autonomous vehicle and operate the vehicle based at least in part on the determination or classification. In some implementations, main processing logic 305 can process images or cloud points obtained from sensors to determine or classify objects. In some implementations, main processing logic 305 accesses mapping data 303 in addition to processing the sensor data received from time sensitive network switch 350 to determine operation instructions for operating the autonomous vehicle. Mapping data 303 may be collected by vehicles other than the vehicle that is collecting the sensor data. Mapping data 303 may include positions of static objects (e.g. buildings, barriers, streets) in an external environment of an autonomous vehicle as well as other information about the external environment of an autonomous vehicle such as GPS coordinates or other relevant coordinates. Mapping data 303 may be provided to main processing logic 305 from network 390 through interface 301. In some implementations, interface 301 is a wireless protocol such as IEEE 802.11 protocols or cellular data protocols (e.g. 3G, 4G, LTE, 5G). Mapping data 303 may be updated by a plurality of vehicles and periodically updated by main processing logic 305 by downloading the updated mapping data from network 390.

In the illustrated implementation, main processing logic 305 may determine an operation instruction based at least in part on the received sensor data. Main processing logic 305 may then send that operation instruction to control system 310 by way of high-speed data interface 307, time sensitive network switch 350, and control interface 317. Control interface 317 is communicatively coupled between time sensitive network switch 350 and control system 310. Control interface 317 may be one or more 10 Gb/s connections. Control system 310 includes direction control 312, powertrain control 314, and brake control 316, which may be configured similarly to direction control 112, powertrain control 114, and brake control 116 illustrated in FIG. 1C. Therefore, operation instructions may be generated based on mapping data 303 and the sensor data received from time sensitive network switch 350. Once main processing logic 305 generates the operation instructions, the operation instructions may be sent to control system 310 through time sensitive network switch 350.

The term "processing logic" (e.g. main processing logic 305 or processing logic 122) in this disclosure may include one or more processors, microprocessors, multi-core processors, and/or Field Programmable Gate Arrays (FPGAs) to execute operations disclosed herein. In some implementations, memories (not illustrated) are integrated into the processing logic to store instructions to execute operations and/or store data. Processing logic may include analog or digital circuitry to perform the operations disclosed herein.

Network 170 and/or 390 may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors). For example, a machine-readable storage medium includes recordable/non-recordable media (e.g., read only memory (ROM), random access memory (RAM), magnetic disk storage media, optical storage media, flash memory devices).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. A system for an autonomous vehicle comprising:
a plurality of sensors configured to generate sensor data;
a power source that provides power using an elevated voltage;
a time sensitive network switch configured to receive (i) the sensor data from the plurality of sensors and (ii) the elevated voltage from the power source; and
a sensor interface separately coupling a first sensor of the plurality of sensors and a second sensor of the plurality of sensors to the time sensitive network switch, wherein the sensor interface is configured to transfer the elevated voltage and the sensor data between the time sensitive network switch and the sensors.

2. The system of claim 1, wherein the elevated voltage is between 30 VDC and 40 VDC.

3. The system of claim 1, wherein the elevated voltage is between 40 VDC and 50 VDC.

4. The system of claim 1, wherein the sensor interface includes power conductors transferring power corresponding to the elevated voltage,
wherein the power conductors are configured to transfer at least 100 watts to the first sensor and the second sensor of the plurality of sensors.

5. The system of claim 1, wherein the sensor interface includes power conductors transferring power corresponding to the elevated voltage, and
wherein the power conductors have a wire diameter of between 26 AWG and 28 AWG.

6. The system of claim 1, wherein the sensor interface includes power conductors transferring power corresponding to the elevated voltage, and
wherein the power conductors have a wire diameter of between 22 AWG and 26 AWG.

7. The system of claim 1, wherein the sensor interface includes power conductors providing the elevated voltage, and wherein the power conductors have a same wire gauge as a first data conductor and a second data conductor of the sensor interface.

8. The system of claim 1, wherein at least one of the sensors in the plurality of sensors is connected to the sensor interface with a single connector of the sensor.

9. An autonomous vehicle comprising:
a plurality of sensors configured to generate sensor data;
a time sensitive network switch configured to receive the sensor data from the plurality of sensors;
a sensor interface separately coupling a first sensor of the plurality of sensors and a second sensor of the plurality of sensors to the time sensitive network switch, wherein the sensor interface is configured to transfer an elevated voltage and the sensor data between the time sensitive network switch and the sensors; and
a control system configured to navigate the autonomous vehicle autonomously based at least in part on the sensor data.

10. The autonomous vehicle of claim 9 further comprising:
a power distribution module coupled to the time sensitive network switch to provide the elevated voltage to the time sensitive network switch, wherein the power distribution module converts a vehicle battery voltage to the elevated voltage.

11. The autonomous vehicle of claim 10, wherein the time sensitive network switch includes an electrical regulator that regulates a current provided to the plurality of sensors on an individual sensor-by-sensor basis, the current flowing through power conductors of the sensor interface.

12. The autonomous vehicle of claim 9, wherein the elevated voltage is between 30 VDC and 40 VDC.

13. The autonomous vehicle of claim 9, wherein the elevated voltage is between 40 VDC and 50 VDC.

14. The autonomous vehicle of claim 9, wherein the sensor interface includes power conductors transferring power corresponding to the elevated voltage,
wherein the power conductors are configured to transfer at least 100 watts to the first sensor and the second sensor of the plurality of sensors.

15. The autonomous vehicle of claim 9, wherein the sensor interface includes power conductors transferring power corresponding to the elevated voltage, and
wherein the power conductors have a wire diameter of between 26 AWG and 28 AWG.

16. The autonomous vehicle of claim 9, wherein the sensor interface includes power conductors transferring power corresponding to the elevated voltage, and
wherein the power conductors have a wire diameter of between 22 AWG and 26 AWG.

17. The autonomous vehicle of claim 9, wherein the sensor interface includes power conductors providing the elevated voltage, and wherein the power conductors have a same wire gauge as a first data conductor and a second data conductor of the sensor interface.

18. A sensor electrical harness for an autonomous vehicle, the sensor electrical harness comprising:
a first connector coupled to a time sensitive network switch;
a second connector coupled to a sensor of the autonomous vehicle, wherein the sensor is configured to generate sensor data;
power conductors configured to transfer an elevated voltage to the sensor, wherein the power conductors are coupled between the first connector and the second connector; and
data conductors configured to transmit the sensor data generated by the sensor to the time sensitive network switch.

19. The sensor electrical harness of claim 18, wherein the elevated voltage is between 30 VDC and 40 VDC.

20. The sensor electrical harness of claim 18, wherein the elevated voltage is between 40 VDC and 50 VDC.

* * * * *